(12) United States Patent
Kusamoto et al.

(10) Patent No.: US 7,149,079 B2
(45) Date of Patent: Dec. 12, 2006

(54) ELECTRONIC APPARATUS HAVING KEYBOARD

(75) Inventors: Jyoji Kusamoto, Ome (JP); Masato Nakatani, Kawaguchi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 26 days.

(21) Appl. No.: 10/945,431

(22) Filed: Sep. 21, 2004

(65) Prior Publication Data

US 2005/0068719 A1    Mar. 31, 2005

(30) Foreign Application Priority Data

Sep. 25, 2003  (JP) .............................. 2003-334181

(51) Int. Cl.
*G06F 1/16* (2006.01)
(52) U.S. Cl. ...................... 361/683; 361/686
(58) Field of Classification Search ................ 361/683, 361/680
See application file for complete search history.

(56) References Cited

U.S. PATENT DOCUMENTS

| | | | | |
|---|---|---|---|---|
| 5,335,141 | A | * | 8/1994 | Hosoi .......................... 361/680 |
| 5,691,880 | A | * | 11/1997 | Seto et al. ................... 361/683 |
| 5,808,861 | A | | 9/1998 | Nakajima et al. |
| 6,064,564 | A | * | 5/2000 | Song et al. .................. 361/680 |
| 6,510,048 | B1 | * | 1/2003 | Rubenson et al. ........... 361/680 |
| 6,595,786 | B1 | * | 7/2003 | Horiuchi et al. ............ 361/680 |
| 2004/0080899 | A1 | | 4/2004 | Hill et al. |

FOREIGN PATENT DOCUMENTS

| | | |
|---|---|---|
| DE | 42 35 821 A1 | 7/1993 |
| JP | 8-63260 | 3/1996 |
| JP | 2002-236523 | 8/2002 |
| JP | 2002-268774 | 9/2002 |
| JP | 3382073 | 12/2002 |
| JP | 3394818 | 1/2003 |
| JP | 2003-140770 | 5/2003 |

OTHER PUBLICATIONS

Office Action for Chinese Application 200410011712X, Jan. 27, 2006.

* cited by examiner

*Primary Examiner*—Lisa Lea-Edmonds
(74) *Attorney, Agent, or Firm*—Pillsbury Winthrop Shaw Pittman, LLP

(57) ABSTRACT

An electronic apparatus comprises a main body, a unit support portion provided in the main body, and an input unit to be set in the unit support portion. The input unit has an edge portion to be engaged with the unit support portion. A first holding member holds a portion of the input unit, which is different from the edge portion, to the unit support portion. A second holding member holds a portion of the input unit, which is different from the portion held by the first holding member, to the unit support portion.

20 Claims, 5 Drawing Sheets

ELECTRONIC APPARATUS HAVING KEYBOARD

CROSS-REFERENCE TO RELATED APPLICATIONS

This application is based upon and claims the benefit of priority from prior Japanese Patent Application No. 2003-334181, filed Sep. 25, 2003, the entire contents of which are incorporated herein by reference.

BACKGROUND OF THE INVENTION

1. Field of the Invention

The present invention relates to an electronic apparatus, such as a portable computer, having a keyboard in its main body, in particular, a structure for fixing a keyboard on a main body.

2. Description of the Related Art

Electronic apparatuses such as portable computers include a main unit having a keyboard. Standard keyboards have a keyboard base, and a plurality of key tops arranged on a top surface of the keyboard base. In keyboards of this kind, the sizes of the keyboard bases and key tops are standardized. Therefore, standardized keyboards can be used for different types of portable computers, and thereby the cost of the portable computers is reduced.

Each of Jpn. Pat. Appln. KOKAI Pub. No. 2002-236523 (Prior Art I), Japanese Patent No. 3394818 (Prior Art II) and Japanese Patent No. 3382073 (Prior Art III) discloses a portable computer having a keyboard on a top surface of its main body.

According to Prior Art I, a keyboard base of a keyboard is detachably supported by a keyboard support portion formed in a top surface of a main body. The keyboard support portion is a recess opened in the top surface of the main body and having a size into which the keyboard base is tightly fitted. The keyboard base has a front edge having a plurality of engaging pieces, and a rear edge having a plurality of mounting pieces. The engaging pieces are detachably engaged with the keyboard support portion. The mounting pieces are fixed to the keyboard support portion by respective screws.

In Prior Art II, a main body comprises a lower case and an upper case. The upper case is divided into a front portion and a rear portion. The rear portion of the upper case has a keyboard support portion into which a keyboard base of a keyboard is fitted. The keyboard base has a front edge having a plurality of first engaging projections, and a rear edge having a plurality of second engaging projections. The first engaging projections are configured to be held between the front portion and the keyboard support portion, when the front portion of the upper case is mounted onto the lower case. The second projections are fixed to the keyboard support portion by respective screws.

Further, in Prior Art III, a keyboard support portion and a parts-mounting part are formed in a top surface of a main body. The keyboard support portion is a recess into which a keyboard base of a keyboard is fitted, and is disposed in front of the parts-mounting part. A front edge and a rear edge of the keyboard base are detachably engaged with the keyboard support portion. The parts-mounting part supports parts such as a speaker. The parts-mounting part is covered with a detachable top cover. The top cover has an engaging wall which enters an rear end of the keyboard support portion. The rear edge of the keyboard base is held between the engaging wall and the keyboard support portion.

As described above, in each of Prior Arts I to III, the keyboard is fixed to the keyboard support portion at the front edge and the rear edge of the keyboard base.

In the meantime, each of Jpn. Pat. Appln. KOKAI Pub. No. 8-63260 (Prior Art IV), Jpn. Pat. Appln. KOKAI Pub. No. 2003-140770 (Prior Art V) and Jpn. Pat. Appln. KOKAI Pub. No. 2002-268774 (Prior Art VI) discloses a portable computer in which a character-inputting keyboard and a ten key pad are arranged on a top surface of a main body.

In each of Prior Arts IV to VI, a first mounting part and a second mounting part are formed on the top surface of the main body. The first and the second mounting parts are independent of each other. The first mounting part supports the keyboard, and the second mounting part supports the ten key pad.

According to Prior Art I–III, the keyboard base of the keyboard has a rectangular shape extending in the width direction of the main body, and left and right side edges each spread over the front edge and the rear edge. However, in the Prior Arts I to III, the keyboard is fixed by fixing only the front edge and the rear edge of the keyboard base to the keyboard support portion. Therefore, the left and right edges of the keyboard base are only placed on the keyboard support portion, not fixed thereto.

In conformity with reduction in thickness of the main body, the thickness of the keyboard base of the keyboard is reduced to minimum. Therefore, it is difficult to ensure stiffness of the keyboard base, and the keyboard base can deform to be warped in the width direction of the main body. Therefore, the conventional structure which fixes only the front and rear edges of the keyboard base causes the problem that the side edges of the keyboard base are raised apart from the keyboard support portion.

Further, according to Prior Arts IV to VI, it is necessary to provide the first mounting part for supporting the keyboard and the second mounting part for supporting the ten key pad separately from each other on the top surface of the main body. This complicates the structure of the main body, and causes increase in the cost of the portable computer. Furthermore, it inevitably increases the mounting parts for the keyboard and ten key pad onto the main body, and thus decreases the workability in mounting and removing the keyboard and ten key pad.

BRIEF SUMMARY OF THE INVENTION

According to an embodiment of the present invention, there is provided an electronic apparatus comprises: a main body; a unit support portion provided in the main body; an input unit to be set in the unit support portion, the input unit having an edge portion to be engaged with the unit support portion; a first holding member which holds a portion of the input unit to the unit support portion, the portion being different from the edge portion of the input unit; and a second holding member which holds a portion of the input unit to the unit support portion, the portion being different from the portion held by the first holding member.

BRIEF DESCRIPTION OF THE SEVERAL VIEWS OF THE DRAWING

The accompanying drawings, which are incorporated and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

A first embodiment of the present invention is explained below with reference to FIGS. 1 to 7.

Figure 1:
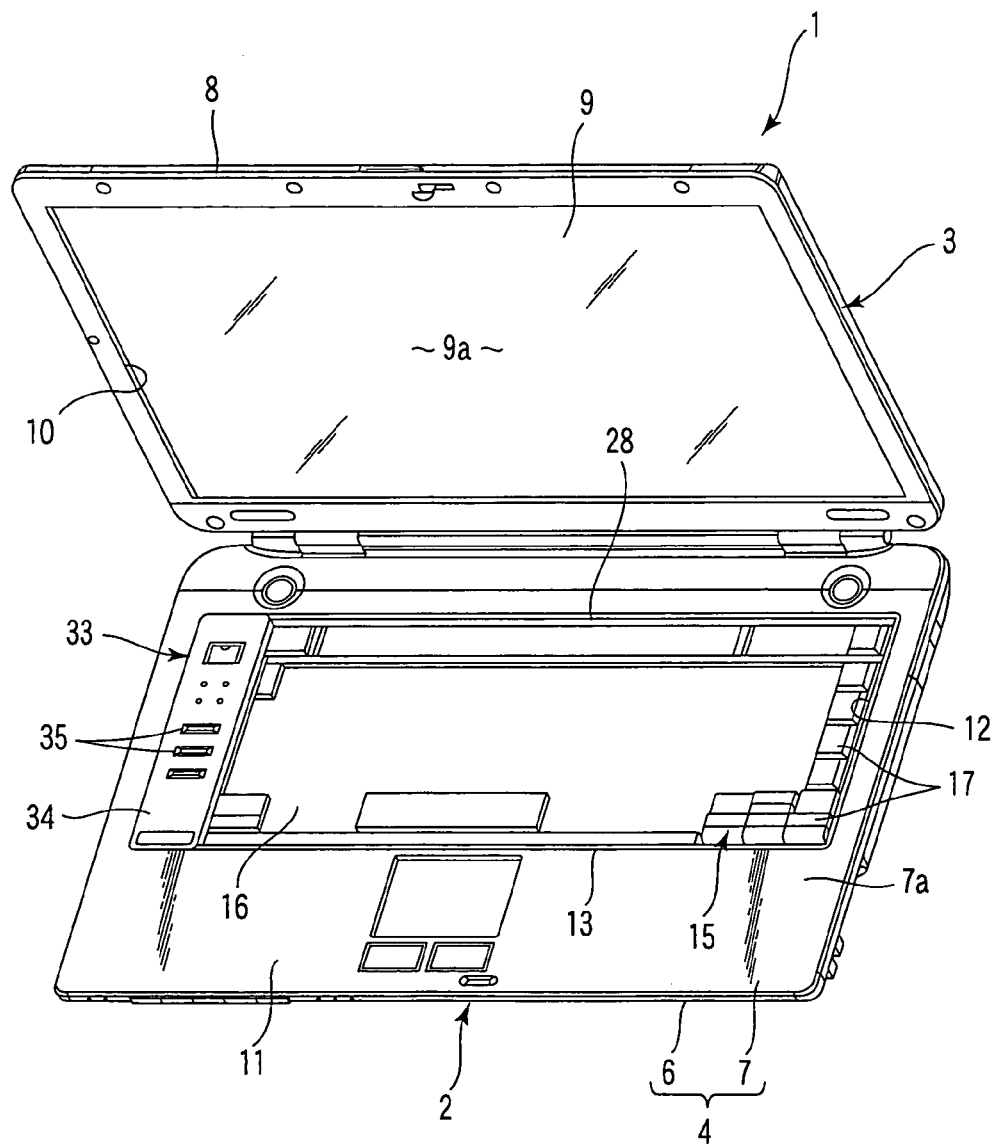
FIG. 1 is a perspective view of a portable computer according to a first embodiment of the present invention.
Figure 5:
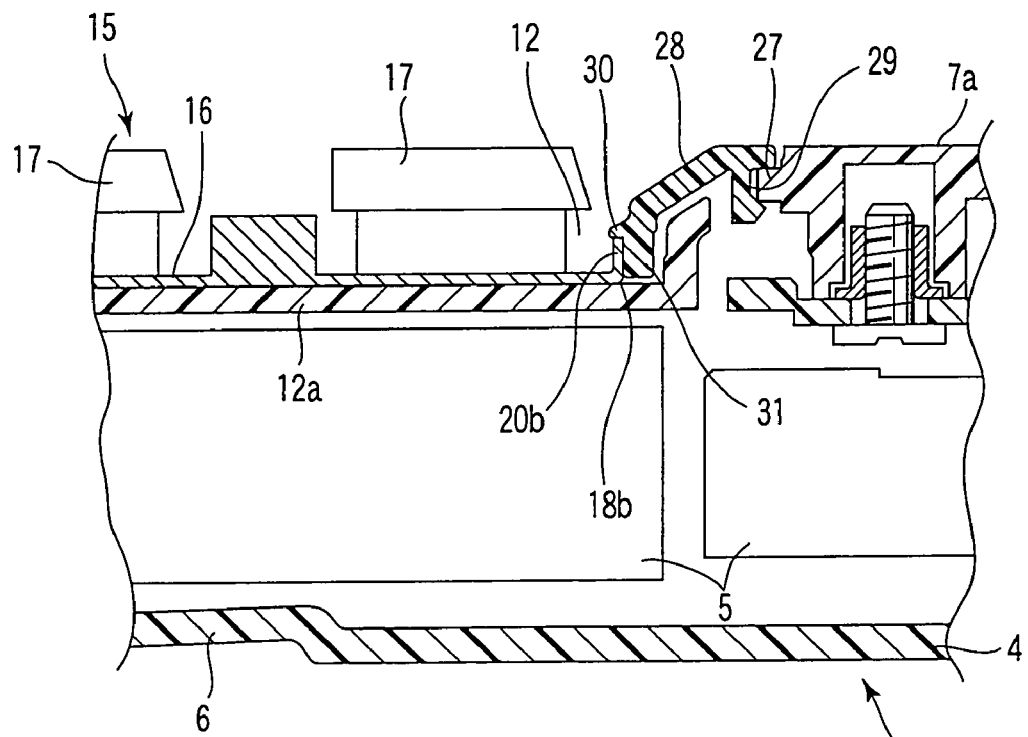
FIG. 5 is a cross sectional view of the portable computer according to the first embodiment of the present invention, illustrating a state where the second edge portion of the keyboard base is held between the keyboard support portion and the keyboard holder.

FIG. 1 discloses a portable computer 1, which is an example of an electronic apparatus of the present invention. The portable computer 1 comprises a main body 2 and a display unit 3. The main body 2 has a housing 4 having a flat box shape. As shown in FIG. 5, the housing 4 contains a plurality of components 5, such as a battery pack, a disk drive and a printed circuit board. The housing 4 comprises a base 6, and a cover 7 covering the base 6. The base 6 supports the components 5. The cover 7 has a flat top wall 7a, and covers the components 5.

The display unit 3 comprises a display housing 8 and a liquid crystal display panel 9. The display housing 8 has a flat box shape having the same size as that of the housing 4, and holds the liquid crystal display panel 9. The liquid crystal display panel 9 has a screen 9a which displays images. The screen 9a is exposed to the outside of the display housing 8 through an opening 10 formed in a front surface of the display housing 8.

The display housing 8 is connected to a rear end of the housing 4 by a hinge (not shown). Therefore, the display unit 3 is rotatable between a closed position and an opened position with the hinge used as axis. In the closed position, the display unit 3 is laid on the housing 4 to cover the main body 2 from above. In the opened position, the display unit 3 stands up with respect to the main body 2 to expose the top wall 7a of the housing 4.

Figure 2:
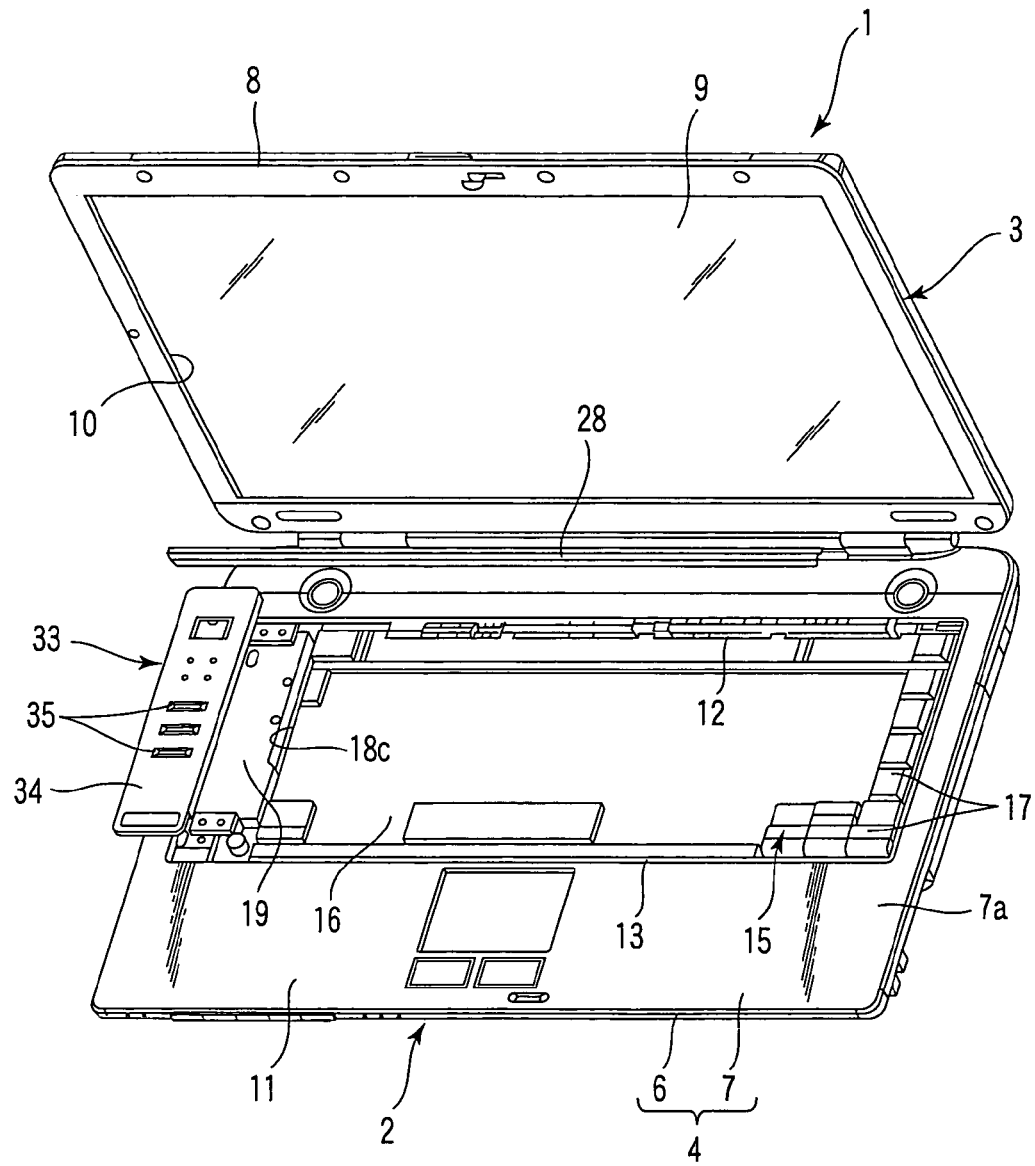
FIG. 2 is a perspective view of the portable computer according to the first embodiment of the present invention, illustrating a state where an operation panel and a keyboard holder are removed from a keyboard support portion of a main body.

As shown in FIGS. 1 and 2, the top wall 7a of the cover 7 includes a palm rest 11 and a keyboard support portion 12 serving as unit support portion. The palm rest 11 is located in a front half portion of the top wall 7a. The keyboard support portion 12 is located in a rear half portion of the top wall 7a. The keyboard support portion 12 is a recess opened in the top wall 7a, and has a rectangular shape extending in the width direction of the housing 4.

Figure 3:
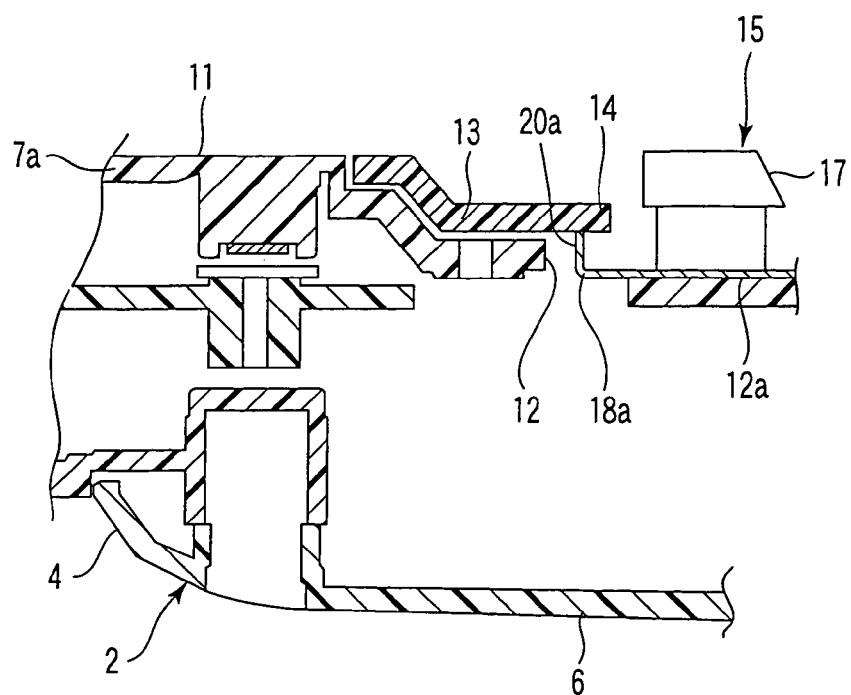
FIG. 3 is a cross sectional view of the portable computer according to the first embodiment of the present invention, illustrating a state where a first edge portion of a keyboard base is engaged with the keyboard support portion.

As shown in FIG. 3, a front cover 13 is mounted at a front end of the keyboard support portion 12. The front cover 13 has a strip-like shape extending in the width direction of the housing 4, and fills a difference in level generated between the palm rest 11 and the keyboard support portion 12. An engaging portion 14 is formed at a rear end of the front cover 13. The engaging portion 14 slightly projects backward from a front end of the keyboard support portion 12, and extends in the width direction of the keyboard support portion 12.

The keyboard support portion 12 supports a first input unit. An example of the first input unit is a keyboard 15 having a standard size. The keyboard 15 comprises a keyboard base 16 and a plurality of key tops 17. The keyboard base 16 has a rectangular shape extending in the width direction of the housing 4, and is superposed on a bottom surface 12a of the keyboard support portion 12. The key tops 17 are supported by a top surface of the keyboard base 16.

As shown in FIGS. 3, 4, 5 and 7, the keyboard base 16 has a front edge portion 18a serving as a first edge portion, a rear edge portion 18b serving as a second edge portion, and a left edge portion 18c serving as a third edge portion. The front edge portion 18a and the rear edge portion 18b extend in the width direction of the housing 4, and are parallel with each other. The left edge portion 18c spreads over the front edge portion 18a and the rear edge portion 18b, and extends in the depth direction of the housing 4. The front edge portion 18a and the rear edge portion 18b are longer than the left edge portion 18c.

According to the first embodiment, the keyboard support portion 12 is greater, in the dimension along the width direction of the housing 4, than the keyboard base 16 of the keyboard 15. Therefore, as shown in FIG. 2, in the state where the keyboard 15 is put in place in the keyboard support portion 12, an extra space 19 outside the keyboard 15 is formed in a left end portion of the keyboard support portion 12. The extra space 19 has an oblong shape extending in the depth direction of the housing 4. The left edge portion 18c of the keyboard base 16 is exposed to the extra space 19.

The front edge portion 18a, the rear edge portion 18b and the left edge portion 18c of the keyboard base 16 project outside the key tops 17. Flange portions 20a, 20b, 20c, each of which is bent upward, are formed on the front edge portion 18a, the rear edge portion 18b and the left edge portion 18c of the keyboard base 16, respectively. The flange portion 20a located on the front edge portion 18a enters under the front cover 13, and is engaged with the engaging portion 14 of the front cover 13. In other words, the front cover 13 covers the front edge portion 18a of the keyboard base 16 from above, and presses the front edge portion 18a down against the bottom surface 12a of the keyboard support portion 12.

Figure 4:
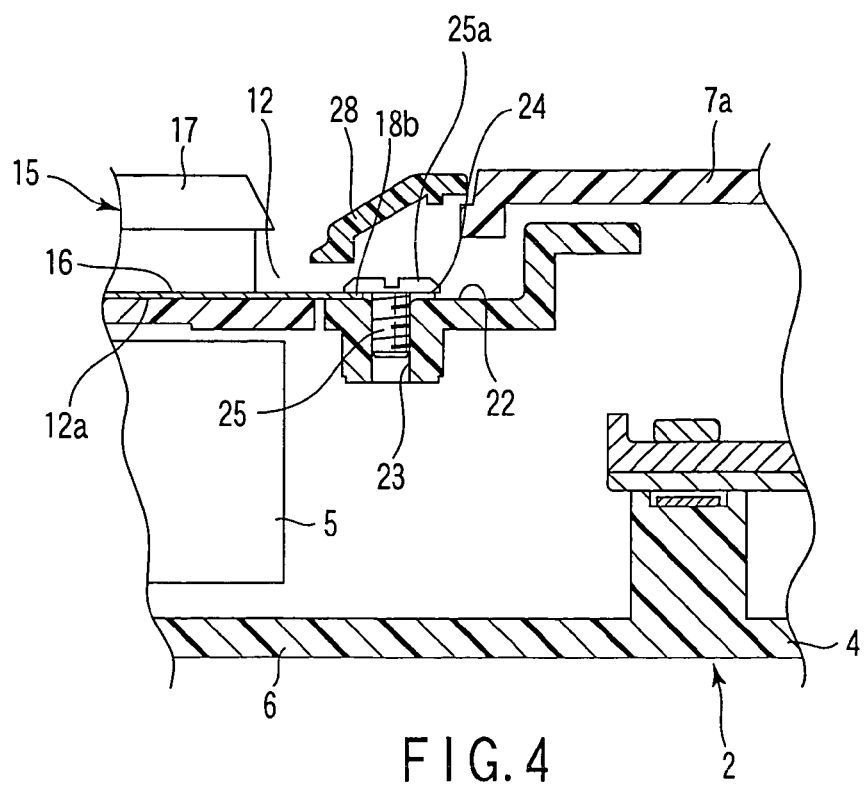
FIG. 4 is a cross sectional view of the portable computer according to the first embodiment of the present invention, illustrating a state where a second edge portion of the keyboard base is fixed onto the keyboard support portion by a screw.

As shown in FIG. 4, a supporting surface 22 which receives the rear edge portion 18b of the keyboard base 16 is formed at the rear end of the keyboard support portion 12. The supporting surface 22 has a plurality of screw holes (only one hole is shown) 23. The screw holes 23 are arranged at intervals in the width direction of the housing 4.

A plurality of screw inserting holes (only one hole is shown) 24 are formed in the rear edge portion 18b of the keyboard base 16. The screw inserting holes 24 are arranged at intervals in the width direction of the housing 4 so as to correspond to the screw holes 23. Screws 25 are inserted through the respective screw inserting holes 24 from above. The screws 25 are screwed into the screw holes 23. By this screwing, a head portion 25a of each screw 25 contacts a top surface of the rear edge portion 18b of the keyboard base 16, and presses the rear edge portion 18b of the keyboard base 16 against the supporting surface 22.

As shown in FIG. 5, an engaging projection 27 is formed on the rear end of the keyboard support portion 12. The engaging projection 27 projects toward the inside of the keyboard support portion 12. A keyboard holder 28 serving as a first holding member is detachably fitted between the rear end of the keyboard support portion 12 and the key tops 17 located in the rearmost row of the keyboard 15. The keyboard holder 28 is formed of synthetic resin, and has a strip-like shape extending in the width direction of the housing 4. The keyboard holder 28 has an engaging groove 29. The engaging groove 29 is open, at a position corresponding to the engaging projection 27, toward the rear end of the keyboard support portion 12.

Further, the keyboard holder 28 has a retaining projection 30 and a guide piece 31. The retaining projection 30 and the guide piece 31 are located on the side opposite to the side which faces the engaging groove 29, and they face the flange portion 20b located on the rear edge portion 18b of the keyboard base 16.

The keyboard holder 28 is pushed into a space between the rear end of the keyboard support portion 12 and the rear edge portion 18b of the keyboard base 16, from above the main body 2. Thereby, the engaging projection 27 of the keyboard support portion 12 is elastically engaged with the engaging groove 29 of the keyboard holder 28. Further, the retaining projection 30 strikes a top end of the flange portion 20b located on the rear edge portion 18b, and simultaneously the guide piece 31 is elastically pressed against a rear surface of the flange portion 20b. Therefore, the keyboard holder 28 is removably held by the keyboard support portion 12, without fixing members such as screws.

Further, the keyboard holder 28 covers the space between the rear end of the keyboard support portion 12 and the rear edge portion 18b of the keyboard base 16. This prevents dust from entering the housing 4 through the space and attaching to the components 5.

In the state where the keyboard holder 28 is retained by the keyboard support portion 12, the retaining projection 30 of the keyboard holder 28 retains the rear edge portion 18b of the keyboard base 16 such that the rear edge portion 18b is held between the retaining projection 30 and the keyboard support portion 12. Simultaneously, the keyboard holder 28 covers the head portion 25a of each of the screws 25. Therefore, the keyboard holder 28 holds the keyboard base 16 down to the keyboard support portion 12, in a position different from that of the front edge portion 18a of the keyboard base 16 engaged with the keyboard support portion 12.

Figure 6:
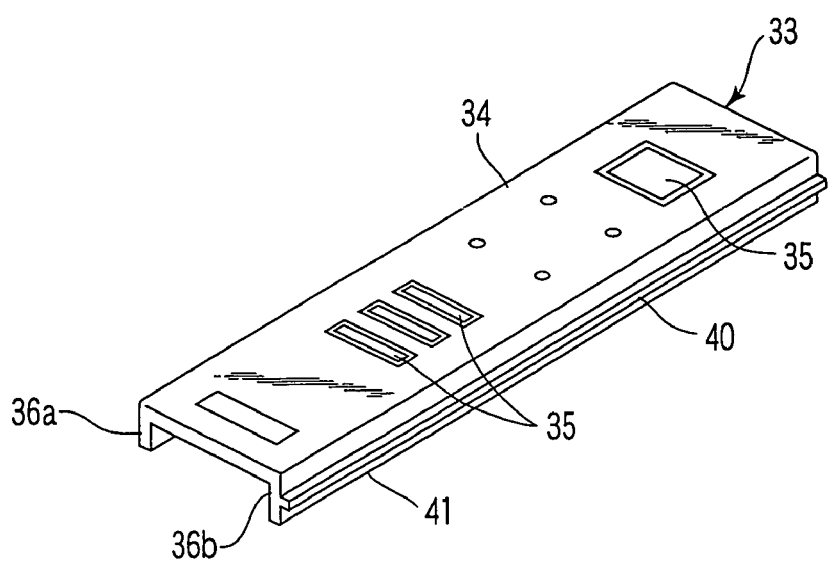
FIG. 6 is a perspective view of the operation panel according to the first embodiment of the present invention.
Figure 7:
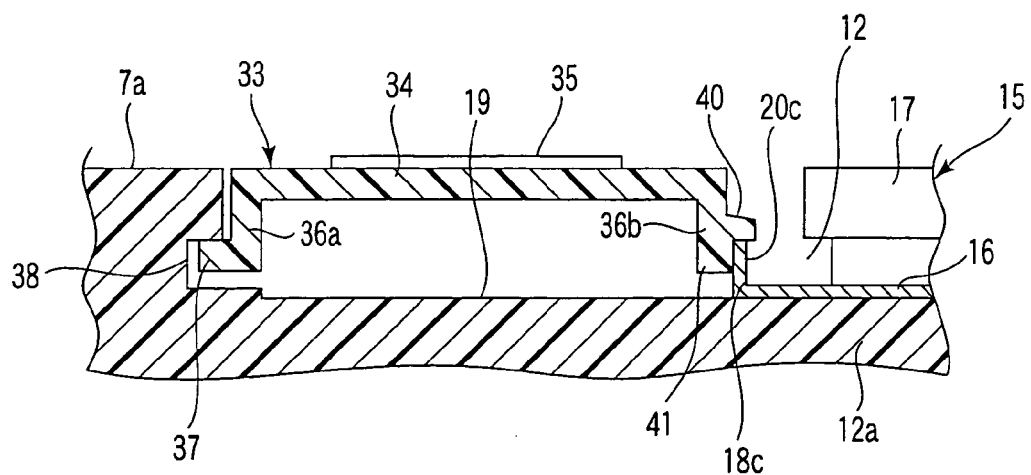
FIG. 7 is a cross sectional view of the portable computer according to the first embodiment of the present invention, illustrating a state where a third edge portion of the keyboard base is held between the keyboard support portion and the operation panel.

As shown in FIGS. 1, 2 and 7, a second input unit is supported in the extra space 19 of the keyboard support portion 12. An example of the second input unit is an operation panel 33 as shown in FIG. 6. The operation panel 33 has a main body 34. The main body 34 is formed of synthetic resin, and has a box shape of a size which is tightly fitted into the extra space 19. A plurality of operation parts 35, such as shortcut keys and switches, are arranged on a top surface of the main body 34.

The main body 34 has a first end portion 36a and a second end portion 36b. The first and second end portions 36a and 36b are apart from each other in the width direction of the housing 4, and extend in the depth direction of the housing 4. The first end portion 36a of the main body 34 faces the left edge of the keyboard support portion 12, and has a plurality of engaging hooks 37 (only one hook is shown). The engaging hooks 37 are arranged at intervals in the depth direction of the housing 4. The left edge of the keyboard support portion 12 has a recessed portion 38 with which the engaging hooks 37 are removably engaged.

The second end portion 36b of the main body 34 faces the left edge portion 18c of the keyboard base 16. The second end portion 36b has a retaining projection 40 and a guide piece 41. The retaining projection 40 and the guide piece 41 face the flange portion 20c located on the left edge portion 18c.

The operation panel 33, in an inclined state where the first end portion 36a is in the head, is inserted into the extra space 19 of the keyboard support portion 12. Thereby, the engaging hooks 37 are elastically engaged with the recessed portion 38. If the main body 34 is pushed into the extra space 19, the retaining projection 40 strikes a top end of the flange portion 20c located on the left edge portion 18c of the keyboard base 16, and the guide piece 41 is elastically pressed against a side surface of the flange portion 20c. Therefore, the operation panel 33 is removably retained in the extra space 19 of the keyboard support portion 12, without fixing members such as screws.

In the state where the operation panel 33 is retained in the extra space 19 of the keyboard support portion 12, the retaining projection 40 of the main body 34 retains the left edge portion 18c of the keyboard base 16 such that the left edge portion 18c is held between the retaining projection 40 and the keyboard support portion 12. Therefore, the operation panel 33 holds the keyboard base 16 down to the keyboard support portion 12, in a position different from that of the keyboard holder 28.

According to the first embodiment of the present invention, the rear edge portion 18b of the keyboard base 16 is held between the keyboard support portion 12 and the keyboard holder 28, and the left edge portion 18c of the keyboard base 16 is held between the keyboard support portion 12 and the operation panel 33. Therefore, the keyboard 15 is held by the keyboard support portion 12 in the three positions, that is, the front edge portion 18a, the rear edge portion 18b and the left edge portion 18c of the keyboard base 16. This prevents the keyboard 15 from rising apart from the keyboard support portion 12. Thus, the keyboard 15 can be securely fixed onto the keyboard support portion 12.

Further, the keyboard holder 28 which holds the rear edge portion 18b of the keyboard base 16 and the operation panel 33 which holds the left edge portion 18c of the keyboard base 16 are only pushed into the keyboard support portion 12. Thereby, the keyboard holder 28 and the operation panel 33 can be easily mounted on, and removed from, the keyboard support portion 12. The keyboard base 16 can be easily held between the keyboard support portion 12 and each of the keyboard holder 28 and the operation panel 33, and can be easily disengaged from the holding. This enables easy mounting and removal of the keyboard 15.

Furthermore, according to the above structure, the operation panel 33 retained in the extra space 19 of the keyboard support portion 12 also serves as the second holding member which holds down the left edge portion 18c of the keyboard base 16. Therefore, fixing of the keyboard 15 to the keyboard support portion 12 is completed simultaneously with fixing of the operation panel 33 to the keyboard support portion 12.

By this operation, the operation panel 33 is held in the extra space 19 of the keyboard support portion 19, and thus it is unnecessary to provide the cover 7 of the housing 4 with a dedicated support portion for the operation panel 33. This simplifies the structure of the housing 4, and contributes to reduced cost of the portable computer 1.

Figure 8:
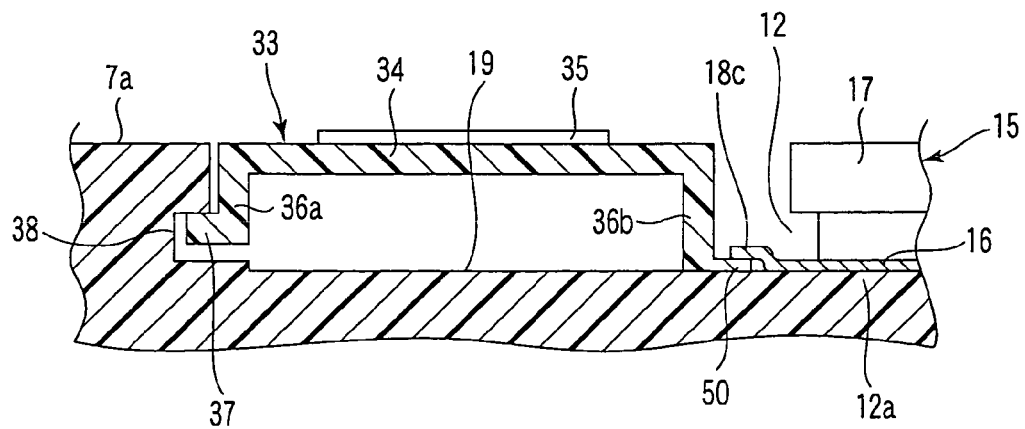
FIG. 8 is a cross sectional view of a portable computer according to a second embodiment of the present invention, illustrating a state where a second end portion of an operation panel is held between a third edge portion of a keyboard base and a keyboard support portion.

The present invention is not limited to the first embodiment. FIG. 8 discloses a second embodiment of the present invention. The second embodiment is different from the first embodiment in that the second end portion 36b of the control panel 33 is held between the left edge portion 18c of the keyboard base 16 and the keyboard support portion 12. The other parts of the structure of the portable computer 1 according to the second embodiment are the same as those in the first embodiment. Therefore, in the second embodiment, the same constituent elements as those in the first embodiment are denoted by the same respective reference numerals, and explanations thereof are omitted.

As shown in FIG. 8, a main body 34 of a control panel 33 has a second end portion 36b including a plurality of projecting pieces 50 (only one piece is shown). The projecting pieces 50 are arranged at intervals in the depth direction of the housing 4. A left edge portion 18c of a keyboard base 16 is superposed on the projecting pieces 50, and retains the projecting pieces 50 such that the projecting pieces 50 are held between the left edge portion 18c and a bottom surface 12a of a keyboard support portion 12.

According to the second embodiment of the present invention, the operation panel 33, in an inclined state where a first end portion 36a is in the head, is inserted into an extra space 19 of the keyboard support portion 12, before a keyboard 15 is set in the keyboard support portion 12. Thereby, engaging hooks 37 are elastically engaged with a recessed portion 38. When the main body 34 is pushed downward into the extra space 19, the projecting pieces 50 are superposed on the bottom surface 12a of the keyboard support portion 12.

The keyboard 15 is fixed to the keyboard support portion 12 in the same manner as the first embodiment, when the operation panel 33 is set in the extra space 19. Specifically, the keyboard 15 is retained in the keyboard support portion 12, by engaging a front edge portion 18a of the keyboard base 16 with an engaging portion 14 of a front cover 13 and pressing a rear end portion 18b of the keyboard base 16 against a supporting surface 22 by screws 25 and a keyboard holder 28.

In the state where the keyboard 15 is retained in the keyboard support portion 12, the left edge portion 18c of the keyboard base 16 presses the second end portion 36b of the operation panel 33 against the keyboard support portion 12. In other words, the second end portion 36b of the operation panel 33 is held between the left edge portion 18c of the keyboard base 16 and the bottom surface 12a of the keyboard support portion 12. Thereby, the engaging hooks 37 of the operation panel 33 are retained in the state of being engaged with the recessed portion 38 of the keyboard support portion 12. Therefore, the operation panel 33 is retained in the extra space 19 of the keyboard support portion 12.

Further, according to the second embodiment, the keyboard base 16 which holds the projecting pieces 50 of the operation panel 33 down to the keyboard support portion 12 is held down to the keyboard support portion 12 by the keyboard holder 28. Therefore, the projecting pieces 50 of the operation panel 33 is indirectly held between the keyboard holder 28 and the keyboard support portion 12. Thus, the keyboard holder 28 by itself can hold both the keyboard 15 and the operation panel 33 in the keyboard support portion 12.

The present invention is not limited to the first and second embodiments. For example, the extra space holding the operation panel is not limited to be located on the left side of the keyboard, but may be located on the right side of the keyboard.

Further, if the operation panel has a plurality of ten keys arranged in a row at intervals in the width direction of the housing, the extra space may be formed between the front edge portion of the keyboard base and the front end of the keyboard support portion, or between the rear edge portion of the keyboard base and the rear end of the keyboard support portion. Then, the operation panel may be provided in the extra space.

Furthermore, instead of the operation panel, a face panel having a size corresponding to the extra space may be prepared and used as the second holding member which holds down the left edge portion of the keyboard base.

In addition, the screws which fix the rear edge portion of the keyboard base to the keyboard support portion are not indispensable constituent elements. For example, the screws may be omitted, and the rear edge portion of the keyboard base may be held down to the keyboard support portion only by the keyboard holder.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
   a main body;
   a unit support portion provided in the main body;
   an input unit to be set in the unit support portion, the input unit has an edge portion to be engaged with the unit support portion, and another edge portion different from the edge portion;
   a first member set in the unit support portion, at a position corresponding to a portion of the input unit, the portion being different from the edge portion and the another edge portion of the input unit, and positioned between the unit support portion and the first member; and
   a second member set in the unit support portion, at a position corresponding to the another edge portion of the input unit, the another edge portion being positioned between the unit support portion and the second member.

2. The electronic apparatus according to claim 1, wherein the portion positioned between the unit support portion and the first member is fixed to the unit support portion by a screw, and the first member covers the screw.

3. The electronic apparatus according to claim 1, wherein the another edge portion is adjacent to the edge portion, and held between the second member and the unit support portion.

4. The electronic apparatus according to claim 1, wherein the second member has a first end portion which is removably engaged with the unit support portion, and a second end portion which retains said another edge portion of the input unit such that said another edge portion is held between the second end portion and the unit support portion.

5. The electronic apparatus according to claim 1, wherein the first member is located on a side of the input unit opposite to the edge portion to be engaged with the unit support portion, and the second member is adjacent to the first member.

6. The electronic apparatus according to claim 1, wherein the unit support portion has an extra space out of the input unit when the input unit is set, and the second member is set in the extra space.

7. An electronic apparatus comprising:
a main body;
a unit support portion provided in the main body;
an input unit to be set in the unit support portion, the input unit having a first edge portion, a second edge portion different from the first edge portion, and a third edge portion different from the first and second edge portions, the first edge portion being removably engaged with the unit support portion; and
a first and a second holding members which are to be removably set in the unit support portion, the second edge portion of the input unit being positioned between the unit support portion and the first member, and the third edge portion of the input unit being positioned between the unit support portion and the second member.

8. The electronic apparatus according to claim 7, wherein the second edge portion is located opposite to the first edge portion, and the third edge portion is adjacent to the first edge portion.

9. The electronic apparatus according to claim 8, wherein the second edge portion of the input unit is fixed to the unit support portion by a screw, and the first member covers the screw when the first member is set in the unit support portion.

10. The electronic apparatus according to claim 7, wherein the first and second edge portions of the input unit extend in a width direction of the main body, the third edge portion of the input unit extends in a depth direction of the main body, and the first and second edge portions are longer than the third edge portion.

11. The electronic apparatus according to claim 7, wherein the second member has a first end portion which is removably engaged with the unit support portion, and a second end portion which holds the third edge portion of the input unit to the unit support portion.

12. The electronic apparatus according to claim 11, wherein the unit support portion has an extra space out of the input unit when the input unit is set, and the second member is set in the extra space.

13. The electronic apparatus according to claim 12, wherein the third edge portion of the input unit is located in the extra space of the unit support portion.

14. An electronic apparatus comprising:
a main body;
a unit support portion provided in the main body;
a first input unit to be set in the unit support portion, the first input unit having an edge portion to be engaged with the unit support portion;
a holding member which holds a portion of the first input unit to the unit support portion, the portion being different from the edge portion of the first input unit; and
a second input unit to be set in the unit support portion, the second input unit is held to the unit support portion by the first input unit.

15. The electronic apparatus according to claim 14, wherein the first input unit has another edge portion different from the edge portion, said another edge portion retains the second input unit such that the second input unit is held between said another edge portion and the unit support portion.

16. The electronic apparatus according to claim 15, wherein the second input unit has a first end portion which is removably engaged with the unit support portion, and a second end portion which holds said another edge portion of the first input unit to the unit support portion.

17. The electronic apparatus according to claim 14, wherein the first input unit is fixed, at a portion different from the edge portion to be engaged with the unit support portion, to the unit support portion by a screw, and the holding member covers the screw.

18. An electronic apparatus comprising:
a main body;
a unit support portion provided in the main body;
a first input unit to be set in the unit support portion, the first input unit has an edge portion to be engaged with the unit support portion, and another edge portion different from the edge portion;
a second input unit to be set in the unit support portion; and
a holding member which holds said another edge portion of the first input unit and the second input unit to the unit support portion.

19. The electronic apparatus according to claim 18, wherein said another edge portion of the first input unit is fixed to the unit support portion by a screw, and the holding member covers the screw.

20. The electronic apparatus according to claim 18, wherein the second input unit has a first end portion which is removably engaged with the unit support portion, and a second end portion which is held between the first input unit and the unit support portion.

* * * * *